United States Patent [19]

Hall et al.

[11] Patent Number: 4,481,324

[45] Date of Patent: Nov. 6, 1984

[54] POLYGLYCEROL PLASTIC LUBRICANTS

[75] Inventors: Larry K. Hall, Cogan Station; Marvin Rosen, Williamsport, both of Pa.

[73] Assignee: Glyco Inc., Williamsport, Pa.

[21] Appl. No.: 469,911

[22] Filed: Feb. 25, 1983

[51] Int. Cl.³ .......................... C08K 5/10; C08L 9/02; C08L 27/06; C08L 23/12

[52] U.S. Cl. .................................... 524/312; 264/211; 264/213; 524/306; 524/311; 524/543; 524/556; 524/559; 524/563; 524/565; 524/568; 524/569; 524/576; 524/577; 524/583; 524/590; 524/609; 524/611; 524/612

[58] Field of Search ................ 264/211, 213; 524/306, 524/311, 312, 543, 569

[56] References Cited

U.S. PATENT DOCUMENTS

| | | | |
|---|---|---|---|
| 3,624,186 | 11/1971 | Kubota | 264/211 |
| 3,966,857 | 6/1976 | Charlton et al. | 264/211 |
| 3,981,838 | 9/1976 | Wilson | 264/211 |
| 4,012,357 | 3/1977 | Foulks et al. | 524/312 |
| 4,230,607 | 10/1980 | Watts et al. | 524/312 |

FOREIGN PATENT DOCUMENTS

| | | |
|---|---|---|
| 2638790 | 3/1977 | Fed. Rep. of Germany ...... 524/312 |
| 3118417 | 11/1982 | Fed. Rep. of Germany . |

*Primary Examiner*—Ronald W. Griffin
*Attorney, Agent, or Firm*—Cushman, Darby & Cushman

[57] ABSTRACT

Enhanced lubricating properties and good heat stability upon processing are imparted to thermoplastic materials such as polyvinyl chloride, polypropylene and acrylonitrile-butadiene-styrene resins by the incorporation therein of a polyglycerol ester of a $C_8$ to $C_{22}$ fatty acid. The ester is characterized by a degree of polymerization ranging from 2 to 8 and a degree of acid substitution ranging from 1 to 10.

25 Claims, No Drawings

POLYGLYCEROL PLASTIC LUBRICANTS

BACKGROUND OF THE INVENTION

The present invention relates to the lubrication of thermoplastic materials such as polyvinyl chloride (PVC), polypropylene (PP) and acrylonitrile-butadiene-styrene (ABS).

Lubricants are incorporated into plastics materials primarily to improve processibility of the material compounded by lowering melt viscosity and/or by preventing the polymer from sticking to the metal surface of the processing equipment. Lubricants may be classified functionally as either internal or external; or they may exhibit certain qualities attributable to both, and in such instances are classified as internal/external.

Internal lubricants are soluble in the polymer system and alter the cohesive forces between polymer chains so as to improve the flow of polymer chains past one another, thus lowering melt viscosity and improving flow properties.

External lubricants migrate to the surface of the polymer and provide lubrication between the molten and fused plastic composition and metallic parts of the processing equipment.

A good discussion of the function of plastic lubricants is found in A. P. Wilson's U.S. Pat. No. 3,981,838:

"In processing high melt viscosity polymers such as polyvinyl chloride (PVC) by extrusion, milling, calendering and injection molding, the shear forces applied cause excessive frictional heat which may lead to serious thermal stability problems. Another problem in processing PVC is to assure that the polymer releases from metal surfaces of the processing equipment. To solve these problems two types of lubricants are used. Lubricants which lower the melt viscosity and control frictional heat build-up are called internal lubricants while substances which promote release are called external lubricants. These materials are used in relatively small amounts since an excess will cause processing and stability problems and structural weakness in the ultimate product. In the processing of polymers such as PVC discrete particles are subjected to stress and heat until there is fusion of the discrete particles and a resulting loss of particle identity. An excess amount of an external lubricant will tend to coat the individual particles and while promoting a slippage between particles will delay fusion.

The role of the external lubricant is to reduce the surface tackiness of the polymer, particularly during fabrication, thus reducing the tendency of the polymer to adhere to metallic surfaces. The desired degree of lubricity is something less than total release .... External lubrication ... can be most easily established by measuring the time required for a lubricated polymer to exhibit sticking to the metal walls of a dynamic mill at elevated temperatures ....

The role of the internal lubricant is to reduce the internal friction within the polymeric melt, which includes reducing heat build-up when the polymer is subjected to stress. Because of the characteristic high melt viscosities of rigid PVC an internal lubricant is usually viewed as being necessary to improve flow properties. Their use will result in an economic advantage in that less work will be expended at a given set of processing conditions. In addition, improved product appearance usually results, particularly with respect to improved surface appearance. An internal lubricant will promote fusion."

Other distinguishing characteristics of internal and external lubricants are the effects they have on fusion time. Internal lubricants show no change in fusion time as the concentration of lubricant increases in the polymer system; external lubricants lengthen fusion time with increasing concentration.

Some lubricants exhibit properties of both internal and external lubricants and are identified as internal/external. The degree of each type of lubricity imparted in a specific application is dependent on the type and concentration of lubricant employed, the composition of the plastic system, the type of processing equipment, and the operating parameters of the processing system.

In some instances, one encounters undesirable side effects in the use of lubricants, most notably in the reduction of heat stability which can lead to such major production problems as:

Thermal degradation of the thermoplastic material within the extruder requiring a halt of process operations for clean out.

Recycling of materials is limited.

The use of thermoplastic materials in light colored goods is limited.

High levels of expensive heat stabilizers may be required.

Accordingly, it is the primary object of the present invention to provide lubricants for thermoplastic materials which possess good processing qualities without adversely affecting the heat stability of the processed material.

A further object of our invention is to provide a means for efficiently lubricating thermoplastic materials while minimizing degradation attendant to the heat of processing.

These and other objects will become more apparent from the discussion which follows.

SUMMARY OF THE INVENTION

Polyglycerol esters according to the present invention function as lubricants in the processing of thermoplastic materials. Polyglycerol esters have three degrees of freedom for varying molecular structure: (1) the degree of polymerization (DP) of glycerin, (2) the degree of esterification (n), viz. the number of ester groups formed, and (3) the type or types of acids used to esterify the polyglycerol molecule. The polyglycerol esters which may be used according to the present invention are those esters of fatty acids having a carbon chain of from $C_8$ to $C_{22}$; a degree of polymerization of from 2 to 8 (preferably 2 to 4); and a degree of esterification of up to 10 (preferably 2 to 4). The maximum degree of esterification is expressed by the relationship ($n_{max}$=DP+2). The fatty acid may be straight chain, branched, saturated, or unsaturated.

Performance of the specified polyglycerol esters varies from internal/external to external as the degree of polymerization (DP) increases in the ester. Similarly, as the degree of esterification (n) increases in the ester, the performance of the lubricant becomes more external. Lubrication performance of these esters becomes more external as the acid chain length increases. Heat stability improves as the chain length increases while fusion time remains short which is exemplary of internal lubrication.

DETAILED DESCRIPTION OF THE INVENTION

Polyglycerol esters are described herein via an alphanumeric coding system. The first digit identifies the degree of polymerization, the second digit the degree of esterification, and the capital letter the type of acid. Abbreviations employed are as follows:

EH: 2-ethylhexanoic acid
C: commercial mixture of caprylic acid and capric acid
S: commercial stearic acid
O: commercial oleic acid
B: commercial behenic acid.

Thus, for example, 2-2-EH identifies diglycerol esterified with two moles of 2-ethylhexanoic acid and 6-5-S identifies hexaglycerol esterified with five moles of stearic acid.

The polyglycerol ester should be incorporated into the resin, prior to processing, in an amount sufficient to lubricate the material. As used herein, the term "processing" is to be understood in the conventional manner. Thus, the thermoplastic material must be compounded prior to processing and conversion into a finished article. The resin material such as PVC, is compounded in a conventional manner by mixing the thermoplastic resin and requisite lubricant together with additives employed in such mixtures, e.g. heat stabilizers, fillers, pigments, flame retardants and the like to form a homogeneous blend. This homogeneous blend (often referred to as a "compound") may be in the form of a powder, chip, or granule and is "processed" to a finished shaped article conventionally using any of a variety of techniques such as injection molding, extrusion, compression molding, blow molding, and calendering. Generally from about 0.10 to 5 parts (preferably about 0.5 to 2.0 parts) of the ester per hundred parts of the resin (phr) is sufficient. If desired, more than one ester may be employed.

The lubricated materials of the present invention are well suited for the production of molded and extruded products, particularly vinyl siding compositions and rigid sheet profiles.

The polyglycerol ester lubricants of the present invention may be incorporated into a variety of thermoplastic materials which can be molded by extrusion or injection techniques.

The lubricants described herein are suitable for use in thermoplastic compounds, whether they are polycondensates or polyaddition compounds. They are particularly suited for use with chlorinated polymers such as PVC, polyvinylidene chloride, chlorinated polyethylene, as well as copolymers thereof derived, for example, from vinyl acetate, acrylic esters, ethylene propylenediene, ethylene vinyl acetate, maleic esters, etc. The lubricants can also be used in other thermoplastics such as polystyrene and copolymers thereof including ABS, and related ABS multipolymers; polyacrylic acid esters, polymethacrylic acid esters, polyamides, polycarbonates, polyurethanes, polyphenylene sulfides, polyphenylene oxides and copolymers thereof.

Where a copolymer is used, the amounts of the comonomers that are used in the various copolymers will depend, inter alia, on the properties required of the molding.

Blends of these plastic resins may also be used in the lubricated compositions.

The choice of the resin will depend upon the use to which the article is to be put.

Especially preferred thermoplastic materials include the polymers and copolymers of polyvinyl chloride, acrylonitrile-butadiene-styrene and polypropylene.

The following examples are offered to more fully illustrate the invention, but are not to be construed as limiting the scope thereof.

Lubricity as a Function of Degree of Polymerization

EXAMPLE ONE—FUSION/MILL STICK

Five polyglycerol esters (2-2-S, 3-2-S, 4-2-S, 6-2-S, 8-2-S) were evaluated for fusion properties, dynamic heat stability, and mill stick properties. The control sample contained no lubricant. Glycerol monostearate (1-1-S) was used as the comparative internal lubricant; XL-165 (Hoechst), a paraffin wax, was used as the comparative external lubricant.

Preparation of Compound One was carried out according to the following procedure.

A Henschel mixer was charged with 100 parts of a PVC resin, K value 56, and mixed at 2300 rpm to 167° F. At this point, 1.5 phr of dibutyltin bis(isooctylmercaptoacetate) were added and mixing continued to 239° F. This masterbatch was discharged onto kraft paper and allowed to cool to 77° F.

Performance tests were conducted using blends of this masterbatch and the required amount of lubricant. These blends were prepared by hand mixing the masterbatch and lubricant for five minutes in a container. The test procedures are set forth below with the results described in Table 1.

Brabender Fusion Procedure

A Brabender Plasticorder, Model EPL-V302, was equipped with a No. 6 roller head, roller blades, and a quick loading chute. The roller head was allowed to equilibrate at 320° F. for 15 minutes. The blades were turned on at 30 rpm, and 55.0 gms of sample were introduced into the mixing bowl through the quick loading chute in a maximum of 20 seconds. The fusion torque and time were recorded. The quick loading chute was removed two minutes after fusion. The torque and stock temperatures were recorded at 10 and 15 minutes after fusion. The torque at 15 minutes after fusion is identified as the equilibrium torque.

Dynamic Stability Procedure

A Brabender Plasticorder, Model EPL-V302, was equipped with a No. 6 roller head, roller blades, and a quick loading chute. The roller head was allowed to equilibrate at 369° F. for 15 minutes. The blades were turned on at 70 rpm, and 55.0 gms of sample were introduced into the mixing bowl through the quick loading chute in a maximum of 20 seconds. The quick loading chute was removed one minute after fusion. Two minutes after fusion, the rotors were stopped, a sample removed from the bowl with a warm spatula, and the rotors restarted immediately (sampling was completed in a maximum of five seconds). The hot sample was molded into a one-half inch button with a hand mold press. Excess was trimmed off the button with a scissors and returned to the bowl. Sampling was repeated periodically. Torque was recorded at each sampling. Degradation was taken as an increase of 100 meter-grams in torque.

Mill Stick Times

The front roll of a two-roll mill was set at 338° F. (23.5 rpm) and the back roll at 347° F. (33.0 rpm). Rolls were hardened, carbonized mild steel; each measured 13" long with a diameter of 6" and was set for a sheet thickness of 0.030 inch. Two hundred grams of sample were banded using a mill knife until a uniform sheet formed on the back roll. The rolls were re-adjusted for a sheet thickness of 0.035 inch. The sheet was milled until sticking occurred. This was determined by periodically cutting the formed sheet with the mill knife until the sheet could not be easily removed from the roll.

TABLE 1

Performance vs. Degree of Polymerization
Compound One

| | Fusion Properties | | | | | | | | Dynamic Stability Time, min. Conc. phr | Mill Stick Time, min. Conc. phr |
|---|---|---|---|---|---|---|---|---|---|---|
| | Time, min. Conc., phr | | | | Equilibrium Torque, mg. Conc., phr | | | | | |
| | 0.25 | 0.50 | 1.00 | 2.00 | 0.25 | 0.50 | 1.00 | 2.0 | 1.00 | 1.00 |
| Control | | 0.9 | | | | | 2400 | | 23.3 | 5.0 |
| 1-1-S | 1.2 | 1.5 | 1.7 | 2.2 | 2400 | 2350 | 2250 | 2080 | 26.3 | 6.0 |
| 1-2-S | 1.2 | 1.3 | 2.8 | 8.3 | 2370 | 2360 | 2300 | 2220 | 26.0 | 17.0 |
| 2-2-S | 1.2 | 1.5 | 3.3 | 8.8 | 2300 | 2280 | 2280 | 2200 | 27.3 | 22.0 |
| 3-2-S | 2.9 | 5.3 | 7.0 | 9.3 | 2350 | 2330 | 2280 | 2150 | 24.5 | 23.0 |
| 4-2-S | 4.2 | 6.5 | 8.2 | 10.4 | 2360 | 2340 | 2290 | 2270 | 24.0 | 28.0 |
| 6-2-S | 3.2 | 6.0 | >30 | | 2370 | 2340 | | | 25.8 | >60 |
| 8-2-S | 1.3 | 11.3 | >30 | | 2400 | 2300 | | | 28.5 | >60 |
| XL-165 | 2.3 | >30 | | | 2340 | | | | 28.8 | 14.0 |

From the data in Table 1 above, it is readily apparent that typical internal lubrication was demonstrated by 1-1-S, viz. essentially no change in fusion time as lubricant concentration was increased. In addition, the mill stick time of 1-1-S was quite short, typical of internal lubrication. Similarly, XL-165 demonstrated properties of an external lubricant—prolonged fusion times with increasing lubricant concentration and a mill stick time of 14 minutes as compared to 6 minutes for GMS. Equilibrium torques were comparable for the control, 1-1-S, and XL-165.

As previously noted, the lubrication properties of polyglycerol enters change from combined internal/external to external characters as the degree of polymerization increases from two to eight. This is demonstrated by the increase of fusion times as the concentration of lubricant is increased. This is exemplified by comparing fusion times of 2-2-S, 3-2-S, and 4-2-S to 1-1-S. Prolonged fusion times and over lubrication is shown by 6-2-S and 8-2-S. The increase in mill stick times as DP increases is an indication of external lubrication in milling and calendering operations. Equilibrium torque values for all the polyglycerol esters were comparable. Equilibrium torque should not increase by the use of lubricants.

Dynamic heat stability times of the polyglycerol esters listed in Table 1 were equal to or better than the control and the internal and external comparators. This is a manifestation of lubrication wherein the lubricant reduces internal friction in the polymer melt and consequently sustains or prolongs the heat stability of the polymer.

EXAMPLE TWO—SURFACE EFFECTS

Further evidence for lubricity imparted by additives to plastics systems are the effects produced on surfaces formed by extrusion. In general, external lubricants will produce glossy surfaces. This is expected since external lubricants prevent polymers from sticking to metal surfaces by providing a thin layer of lubricant at the polymer-metal interface of the processing equipment. This is caused by the insolubility of the lubricant in the polymer system permitting the lubricant to be present at the surface of the extruded polymer. Internal lubricants are soluble in the fused polymer systems allowing polymer chains to slide over each other which reduces the frictional heat build-up in the polymer. Internal lubricants do not migrate to the polymer surface and, therefore, finished products have a non-glossy or matte appearance.

Preparation of Compound Two for this example was carried out in a manner similar to that of Example One.

A Henschel mixer was charged with 100 parts of a PVC resin, K value 64, and mixed at 2800 rpm to 167° F. At this point two phr of dibutyltin bis(isooctylmercaptoacetate) were added and mixing continued to 180° F. Two phr of a polymeric acrylic processing aid (K-120N, Rohm and Haas) and 0.8 phr of calcium stearate were added and mixed to 203° F. Six phr of a polymeric acrylic impact modifier (KM-330, Rohm and Haas) and 12 phr of titanium dioxide were added and mixed to 230° F. This masterbatch was discharged onto kraft paper and allowed to cool to 77° F.

Performance tests were conducted using blends of this masterbatch and the required amount of lubricant. These blends were prepared by hand mixing the masterbatch and lubricant for five minutes in a container.

Brabender Fusion Procedure

The Brabender Plasticorder of Example One was allowed to equilibrate at 365° F. for 15 minutes. The blades were turned on at 75 rpm and 55.0 gms of sample were introduced into the mixing bowl through the quick loading chute in a maximum of 20 seconds. The fusion torque and time were recorded.

The quick loading chute was removed two minutes after fusion. The torque and stock temperatures were recorded at 10 and 15 minutes after fusion. The torque at 15 minutes after fusion is identified as the equilibrium torque.

Dynamic Stability Procedure

The Brabender Plasticorder of Example One was allowed to equilibrate at 365° F. for 15 minutes. The blades were turned on at 120 rpm and 55.0 gms of sample were introduced into the mixing bowl through the quick loading chute in a maximum of 20 seconds. The remainder of the procedure was as in Example One.

Extrusion Procedure

A Brabender Plasticorder, Model EPL-V302, was equipped with a 0.75" extruder with a 3/1 compression ratio screw, an adjustable ribbon die (2" width), and a vibrating hopper. The three zones of the extruder were set at 347, 356, and 365° F.—the die at 374° F.—and allowed to equilibrate for 15 minutes. About 1500 grams of material were extruded. The middle third of the extrudate were used for measurements after air cooling to 77° F.

A Mallinckrodt 60° Pocket Glossmeter, Model 4020, was used to determine gloss by moving the instrument over the extruded tape until a maximum reading was obtained.

Table 2 below provides 60° gloss data in the compound of this Example showing changes in surface gloss of extruded tapes as the degree of polymerization of polyglycerol esters increases from two to eight. Overall, surface gloss of these esters is high, indicative of external lubricity, as compared to the internal lubricant 1-1-S in this filled plastic system. It was noted 1-2-S provided low gloss demonstrating that it too, like 1-1-S, is acting as an internal lubricant. Polyglycerol ester 3-2-S shows a drop in gloss as compared to 2-2-S and 4-2-S; it is more of an internal lubricant than its neighbors. While this cannot be explained on a structural basis, it is obviously more soluble in the polymer than 2-2-S and 4-2-S. On the overall, the polyglycerol esters provided smooth extruded surfaces at all concentrations at the three screw speeds investigated.

TABLE 2

Performance vs. Degree of Polymerization Compound Two

| | 60° Gloss Readings | | | | | | | | |
|---|---|---|---|---|---|---|---|---|---|
| | 40 RPM Conc., phr | | | 75 RPM Conc., phr | | | 120 RPM Conc. phr | | |
| | 0.50 | 1.00 | 1.50 | 0.50 | 1.00 | 1.50 | 0.50 | 1.00 | 1.50 |
| Control | | 9.8 | | | 10.3 | | | 8.9 | |
| 1-1-S | | | 7.6 | | | 6.1 | | | 7.1 |
| 1-2-S | | | 8.2 | | | 9.8 | | | 15.6 |
| 2-2-S | 28.2 | 38.5 | 51.2 | 37.0 | 50.2 | 61.4 | 41.2 | 61.3 | 63.2 |
| 3-2-S | 10.3 | 12.3 | 12.3 | 13.6 | 19.2 | 21.4 | 19.3 | 37.1 | 31.2 |
| 4-2-S | 13.7 | 27.0 | 40.2 | 26.0 | 48.1 | 65.1 | 38.2 | 53.3 | 70.5 |
| 6-2-S | 9.8 | 10.4 | 42.4 | 16.8 | 22.4 | 53.9 | 19.0 | 33.2 | 77.6 |
| 8-2-S | 15.6 | 16.7 | 50.6 | 19.2 | 29.5 | 65.1 | 23.8 | 39.2 | 80.2 |
| XL-165 | 16.3 | 39.2 | (1) | 26.5 | 52.9 | (1) | 40.2 | 82.1 | (1) |

(1) Does not extrude; partially fused.

LUBRICATION AS A FUNCTION OF ACID TYPE

EXAMPLE THREE—FUSION/STABILITY/GLOSS

The lubrication properties of polyglycerol esters were investigated keeping the degrees of polymerization and esterification constant while varying the type of acid used for esterification. Variations in normal acid lengths from $C_8$ to $C_{22}$ were studied. An unsaturated acid, oleic, was compared to a commercial grade of stearic acid. The lubrication properties imparted by esterifying with 2-ethylhexanoic acid as compared to a 50/50 mixture of caprylic/capric acids was included.

The fusion time, equilibrium torques obtained during fusion time, dynamic heat stability, and gloss readings were determined in Compound Two of this Example and are set forth in Table 3 below.

TABLE 3

Performance vs. Acid Type Compound Two

| | Fusion Properties 1.5 phr | | Dynamic Stability 1.5 phr Time, min | 60° Gloss 1.5 phr Percent |
|---|---|---|---|---|
| | Time, min | Eq. Torque, mg | | |
| Control | 1.9 | 2230 | 15.6 | 8.9 |
| 2-2-EH | 2.2 | 2250 | 16.0 | 13.8 |
| 2-2-C | 2.3 | 2230 | 16.5 | 11.2 |
| 2-2-O | 2.9 | 2220 | 18.3 | 14.6 |
| 2-2-S | 3.2 | 2120 | 18.7 | 63.2 |
| 2-2-B | 3.7 | 2120 | 19.8 | 82.1 |

All of these polyglycerol esters demonstrated lubrication properties. Variations in acid chain length had no effect on fusion time or equilibrium torque during fusion. It was notable that dynamic heat stability improved as the length of the acid chain increased.

As previously noted, "Degree of Polymerization", evidence for lubricity is shown by the surface gloss of extruded products. Gloss increased with increasing molecular weight of the acid which indicates external lubrication is provided by esters of this type. This is not unexpected since an increase of molecular weight provided by the longer chain acids would give the incompatibility required for external lubrication. A change from internal to external lubrication was observed as the concentration of 2-2-S was increased for each screw speed.

The gloss of 2-2-O was much lower than that of its saturated analog, 2-2-S, indicating 2-2-O is more soluble in the plastic system than 2-2-S. Therefore, 2-2-O has more internal lubricating properties than 2-2-S.

EXAMPLE FOUR—MILL STICK

Compound One was addressed for mill stick times as in Example One and the results are set forth in Table 4 below.

TABLE 4

Performance vs. Acid Type Compound One

| | Mill Stick, 1.0 phr Time, min. |
|---|---|
| Control | 6 |
| 2-2-EH | 9 |
| 2-2-C | 12 |
| 2-2-S | 22 |
| 2-2-O | 38 |
| 2-2-B | >60 |

External lubricity increased as acid chain length increased as shown by the increase of mill stick time from 9 minutes for 2-2-EH to greater than 60 minutes for 2-2-B, as shown in Table 4 above.

LUBRICITY AS A FUNCTION OF DEGREE OF ESTERIFICATION

EXAMPLE FIVE—MILL STICK

Lubricity of a number of esters as a function of the degree of esterification was studied as exemplified by mill stick times in Compound One. This was shown by changing the degree of esterification and keeping the degree of polymerization and acid type constant. Degrees of polymerization of two and six were selected. The diglycerol esters demonstrated internal lubricity (short mill stick times); the hexaglycerol esters showed external lubricity (long mill stick times). The results are set forth in Table 5 below.

TABLE 5

Performance vs. Degree of Esterification
Compound One

| | Mill Stick, 0.5 phr Min. |
|---|---|
| Control | 5 |
| 2-1-S | 7 |
| 2-2-S | 14 |
| 2-3-S | 9 |
| 6-2-S | 37 |
| 6-3-S | 37 |
| 6-5-S | 35 |
| 6-6-S | 33 |

EXAMPLE SIX—FUSION STABILITY

In the present example, Compound Three was prepared in a manner similar to Examples One and Two.

A Henschel mixer was charged with 100 parts of a PVC resin, K value 65, and mixed at 1800 rpm to 167° F. At this point, 1.5 phr of dibutyltin bis(isooctylmercaptoacetate) were added and mixing continued to 180° F. One phr of a polymeric acrylic processing aid (K-120 ND, Rohm and Haas) and 1.5 phr of calcium stearate were added and mixed to 203° F. Twelve phr of titanium dioxide, 8.0 phr of a polymeric acrylic impact modifier (KM-323B, Rohm and Haas), and 3.0 phr of atomite were added and mixed to 230° F. This blend was discharged onto kraft paper and allowed to cool to 77° F. One hundred parts of this masterbatch were hand mixed for five minutes in a container with 1.5 phr of 2-2-S.

Brabender Fusion Procedure

The procedure was as in Examples One and Two. The Brabender Plasticorder roller head was allowed to equilibrate at 338° F. for 15 minutes. The blades were turned on at 60 rpm and 55.0 gms of sample were introduced into the mixing bowl.

Static Stability Procedure

Both rolls of a two-roll mill were set at 320° F. The back roll rotated at 33.0 rpm; the front roll at 23.5 rpm. Rolls were hardened, carbonized mild steel; each measured 13" long with a diameter of 6" and was set for a sheet thickness of 0.030 inch. Two hundred grams of sample were banded using a mill knife. The rolls were then adjusted to a sheet thickness of 0.040" and the sheet was then cut and re-banded for five minutes and removed from the mill. The sheet was cut into one inch squares before cooling to room temperature. These squares were placed on glass strips in a forced air oven at 374° F. Squares were removed periodically from the oven until degradation occurred. Degradation was taken as change of color to a deep brown.

Compound Three was studied for fusion and static stability at 1.5 phr of 2-2-S. The compound is a typical profile formulation and the results are set forth in Table 6 below.

TABLE 6

| | Compound Three 1.5 phr Lubricant | | |
|---|---|---|---|
| | Fusion | | Static |
| | Time, min. | Equilibrium Torque, mg | Stability Time, min. |
| Control | 1.5 | 2100 | 75–80 |
| 2-2-S | 1.6 | 1700 | 80–85 |

Lubricity was indicated by the decrease in equilibrium torque and increase in static stability over the control.

LUBRICITY IN OTHER THERMOPLASTIC SYSTEMS

EXAMPLE SEVEN—ABS/PP

A series of experiments were carried out to demonstrate the lubrication properties of polyglycerol esters in ABS and polypropylene.

ABS

Compound Preparation

One hundred parts of a high impact extrusion grade acrylonitrile-butadiene-styrene resin were mixed in a Henschel mixer at 1800 rpm to 150° F. One quarter phr of octadecyl-3,5-di-tert-butyl-4-hydroxyhydrocinnamate was added and mixed at the same speed to 180° F. Material was discharged onto kraft paper and cooled to 77° F.

One hundred parts of the above blend were hand mixed for five minutes in a container with 0.5 phr of 2-2-S.

Brabender Fusion

A Brabender Plasticorder, Model EPL-V302, was equipped with a No. 6 roller head, roller blades, and a quick loading chute. The roller head was allowed to equilibrate at 356° F. for 15 minutes. The blades were turned on at 50 rpm and 55.0 gms of sample were introduced into the mixing bowl through the quick loading chute in a maximum of 20 seconds. Fusion occurred immediately. The quick loading chute was removed two minutes after fusion. The equilibrium torque and stock temperature were recorded at 15 minutes after fusion.

There was no sticking to the sides of the bowls when 2-2-S was used. A parallel run, without lubricant, caused considerable sticking and, hence, difficult clean out. Ease of clean out is a sign of positive lubrication as shown in Table 7 below. The stock temperature of 2-2-S was lower than that of the control which indicates less frictional heat build-up. This is an additional sign of lubrication provided by a polyglycerol ester.

Polypropylene

Compound Preparation

One half phr of 2-2-S was hand mixed for five minutes in a container with 100 parts of an unstabilized polypropylene homopolymer.

Mill Stick Times

Both rolls of a two-roll mill were set at 356° F. The back roll rotated at 33.0 rpm; the front roll at 23.5 rpm. Rolls were hardened, carbonized mild steel; each measured 13" long with a diameter of 6" and was set for a sheet thickness of 0.030 inch. Two hundred grams of sample were banded with a mill knife. The rolls were then readjusted to a sheet thickness of 0.035 inch. The sheet was milled until sticking occurred. This was determined by periodically cutting the formed sheet with the mill knife until the sheet could not be easily removed from the roll.

Polypropylene mixed with 2-2-S gave twice the mill stick time as polypropylene by itself. Those observations are manifestations of lubrication provided by polyglycerols esters.

The results are set forth in Table 7 below.

TABLE 7

ABS and Polypropylene Resin Systems, 0.5 phr Lubricant

| | ABS | | | Polypropylene |
|---|---|---|---|---|
| | Fusion | | | |
| | Equilibrium Torque, mg | Temperature, °C. | Cleanout | Mill Stick Time, min |
| Control | 2150 | 189 | Difficult | 3.0 |
| 2-2-S | 2100 | 186 | Very easy | 6.0 |

The invention having been thus described, it will be appreciated that various departures may be made therefrom within the scope of the following claims.

What is claimed is:

1. A rigid lubricated thermoplastic material having incorporated therein, in an amount effective to achieve lubrication of said material when processed, at least one polyglycerol ester of a fatty acid having a degree of polymerization of 2, and having a degree of esterification ranging from 1 to 3, the fatty acid having a carbon chain ranging from $C_{12}$ to $C_{20}$.

2. A material according to claim 1 wherein said thermoplastic material is a chlorinated polymer or copolymer.

3. A material according to claim 2 wherein said polymer or copolymer is selected from the group consisting of polyvinyl chloride, polyvinylidiene chloride, chlorinated polyethylene and copolymer thereof derived from vinyl acetate, acrylic esters, ethylene propylene diene, ethylene vinyl acetate or maleic esters.

4. A material according to claim 1 wherein said thermoplastic material is polystyrene or a copolymer thereof.

5. A material according to claim 1 wherein said thermoplastic material is a polymer or copolymer composed of polyacrylic acid ester, polymethacrylic acid esters, polyamides, polycarbonates, polyurethane, polyphenylene sulfides, or polyphenylene oxides.

6. A material according to claim 1 wherein said thermoplastic material is a resin selected from the group consisting of polyvinyl chloride, polypropylene and acrylonitrile-butadiene-styrene.

7. A material according to claim 1 wherein the degree of esterification is about 2.

8. A material according to claim 7 wherein said material is a polyvinyl chloride resin and the fatty acid is saturated.

9. A material according to claim 6 wherein said lubricant is present in an amount ranging from about 0.10 to 5 parts per hundred parts of the resin.

10. A rigid lubricated polyvinyl chloride material having incorporated therein, in an amount sufficient to achieve lubrication of the material when processed, at least one polyglycerol ester of a $C_{16}$ to $C_{22}$ fatty acid, said ester having a degree of polymerization of 2 and a degree of esterification from 2 to 3.

11. A polyvinyl chloride material according to claim 10 wherein said fatty acid is stearic acid.

12. A polyvinyl chloride material according to claim 10 wherein said ester is present in an amount ranging from about 0.10 to 5 parts per hundred parts of the resin.

13. A method of processing a rigid thermoplastic material which comprises adding to the material prior to processing a polyglycerol ester lubricant, in an amount sufficient to provide lubrication to the material during processing, said polyglycerol ester being characterized by having a degree of polymerization of 2, and a degree of esterification ranging from 1.0 to 3, the fatty acid having a carbon chain ranging from $C_{12}$ to $C_{20}$, and processing the material.

14. A method according to claim 13 wherein said thermoplastic material is a chlorinated polymer or copolymer.

15. A method according to claim 14 wherein said polymer or copolymer is selected from the group consisting of polyvinyl chloride, polyvinylidiene chloride, chlorinated polyethylene and a copolymer thereof derived from vinyl acetate, acrylic esters, ethylene propylene diene, ethylene vinyl acetate or maleic esters.

16. A method according to claim 13 wherein said thermoplastic material is polystyrene or a copolymer thereof.

17. A method according to claim 13 wherein said thermoplastic material is a polymer or a copolymer composed of polyacrylic acid ester, polymethacrylic acid esters, polyamides, polycarbonates, polyurethane, polyphenylene sulfides or polyphenylene oxides.

18. A method according to claim 13 wherein said thermoplastics material is a resin selected from the group consisting of polyvinyl chloride, polypropylene and acrylonitrile-butadiene-styrene.

19. A method according to claim 18 wherein said ester is present in an amount ranging from 0.10 to 5 parts per hundred parts of the resin.

20. A method according to claim 19 wherein the degree of esterification is about 2.

21. A method according to claim 20, wherein the material is polyvinyl chloride.

22. A processed material produced according to the method of claim 13.

23. A siding composition formed by processing the lubricated thermoplastic material of claim 1.

24. A shaped article comprising the compound material of claim 1 which has been processed.

25. A shaped rigid article comprising the compound material of claim 10 which has been processed.

* * * * *